United States Patent
Omura

(10) Patent No.: US 9,287,810 B2
(45) Date of Patent: Mar. 15, 2016

(54) MOTOR CONTROL CIRCUIT

(71) Applicant: MAKITA CORPORATION, Anjo-shi, Aichi (JP)

(72) Inventor: Motohiro Omura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 38 days.

(21) Appl. No.: 14/155,691

(22) Filed: Jan. 15, 2014

(65) Prior Publication Data

US 2014/0203745 A1 Jul. 24, 2014

(30) Foreign Application Priority Data

Jan. 22, 2013 (JP) .................................. 2013-009052

(51) Int. Cl.
| H02P 6/14 | (2006.01) |
| H02P 6/00 | (2006.01) |
| H02P 29/00 | (2006.01) |
| H02H 7/08 | (2006.01) |
| H02H 5/04 | (2006.01) |

(52) U.S. Cl.
CPC ................ *H02P 6/002* (2013.01); *H02H 7/08* (2013.01); *H02P 29/0088* (2013.01); *H02H 5/04* (2013.01)

(58) Field of Classification Search
CPC ................ H01L 2924/0002; H01L 2924/00; H01L 23/34; H01L 29/1608; H01L 29/66068; H01L 29/7803; H01L 29/7815; H01L 29/7828; H03K 17/0822; H03K 2017/0806; B60L 11/1862; B60L 11/1872; G01K 7/01
USPC ............. 318/400.26, 471–473, 254; 361/103, 361/18; 257/48
See application file for complete search history.

(56) References Cited

U.S. PATENT DOCUMENTS

| 4,210,855 | A  | * | 7/1980 | Harer et al. ................... 320/135 |
| 6,222,709 | B1 | * | 4/2001 | Baba ............................... 361/18 |
| 6,269,011 | B1 | * | 7/2001 | Ohshima ........................ 363/50 |
| 6,356,043 | B2 | * | 3/2002 | Baum ...................... 318/400.26 |
| 8,167,182 | B2 |   | 5/2012 | Shima et al. |
| 2008/0043393 | A1 | * | 2/2008 | Petkov .......................... 361/103 |
| 2013/0153900 | A1 | * | 6/2013 | Kinouchi et al. ............... 257/48 |

FOREIGN PATENT DOCUMENTS

JP       A-2008-68357       3/2008

* cited by examiner

*Primary Examiner* — Paul Ip
(74) *Attorney, Agent, or Firm* — Oliff PLC

(57) ABSTRACT

In a motor control circuit, a switching element such as an FET for controlling a motor current and a current detection element for detecting the motor current are connected in series. One terminal of a temperature detection element is electrically connected to an electrical connecting section between the FET and the current detection element, and the other terminal of the temperature detection element is electrically connected to a temperature detection circuit.

11 Claims, 5 Drawing Sheets

MOTOR CONTROL CIRCUIT

This application claims priority to Japanese patent application Ser. No. 2013-9052, the contents of which are incorporated herein by reference.

BACKGROUND OF THE INVENTION

1. Field of the Invention

The present invention relates to a motor control circuit in which a switching element for controlling a motor current and a current detection element for detecting the motor current are connected in series.

2. Description of the Related Art

Japanese Laid-Open Patent Publication No. 2008-68357 discloses a motor control circuit relating thereto. The motor control circuit is used to drive a motor of a driving tool such as an electric power tool. The motor control circuit includes an FET 101 as shown in FIG. 6(A). The FET 101 is a switching element that controls a motor current. A drain terminal (D) of the FET 101 is connected to a motor (not illustrated), and a source terminal S of the FET 101 is connected to a ground E. Also, a chive signal from a controller (not shown is input into a gate terminal (G) of the FET 101.

As shown in FIG. 6(A) and FIG. 7, one terminal of a thermistor 103, i.e. a temperature detection element is connected to the source terminal S of the FET 101, which is connected to the ground E. The other terminal of the thermistor 103 is connected to a temperature detection circuit 104 (refer to FIG. 6(A)). The thermistor 103 is an element whose electrical resistance changes as temperature changes, and the temperature detection circuit 104 detects temperature based on a voltage generated between terminals of the thermistor 103. In general, the one terminal of the thermistor 103 is connected to the ground E.

According to the above-described configuration, temperature of the FET 101, which is transmitted to the thermistor 103 from the source terminal S of the PET 101 via a conductor connected to the ground E and also via the one terminal of the thermistor 103, can be detected by the thermistor 103.

In general, when, detecting the motor current in the above-described motor control circuit, a shunt resistor 105 is inserted between the source terminal S of the FET 101 and the ground E as shown in FIG. 6(B). In the motor control circuit in which the one terminal of the thermistor 103 is connected to the ground E, the temperature of the FET 101 is transferred to the thermistor 103 via the shunt resistor 105. In this configuration, there is a possibility that the temperature of the FET 101 may not be accurately measured.

Thus, there is a need to accurately and efficiently monitor temperature in a motor control circuit by use of a temperature detection element.

SUMMARY OF THE INVENTION

One construction for a motor control circuit can include a switching element that controls a motor current, a current detection element that detects the motor current, a temperature detection element, and a temperature detection circuit. The current detection element is connected to the switching element in series. Further, one terminal of the temperature detection element is electrically connected to an electrical connecting section between the switching element and the current detection element, and the other terminal of the temperature detection element is electrically connected to the temperature detection circuit.

According to this construction, the higher one of the temperature of the switching element and the temperature of the current detection element that are transmitted to the temperature detection element can be accurately measured. Because of this, efficient temperature monitoring can be performed in the motor control circuit by use of a single temperature detection element.

In the above construction, the one terminal of the temperature detection element is connected to the ground via the current detection element. However, a temperature measurement error of the temperature detection element caused by electrical resistance of the current detection element can be negligibly small, because the electrical resistance of the current detection element is extremely small compared to that of the temperature detection element such as a thermistor.

According to another construction, the one terminal of the temperature detection element is soldered to a copper foil solid pattern that is formed on a circuit board, and a width of a narrowest section of the copper foil solid pattern is configured to be larger than widths of the terminals of the temperature detection element.

Because of this, heat of the switching element and the current detection element can be efficiently transferred to the temperature detection element via the copper foil solid pattern, and thus temperature measurement efficiency can be improved.

According to another construction, the switching element and the current detection element may be connected to a direct current power supply.

According to another construction, the switching element and the current detection element may be connected to an alternating current power supply.

According to another construction, the switching element may be controlled such that the motor current becomes zero or decreases when a temperature signal output from the temperature detection circuit exceeds a predetermined value. Because of this, damage to the switching element or the current detection element can be prevented.

According to the above, accurate and efficient temperature monitoring can be performed in the motor control circuit by use of the temperature detection element.

DESCRIPTION OF THE PREFERRED EMBODIMENTS

Each of the additional features and teachings disclosed above and below may be utilized separately or in conjunction with other features and teachings to provide an improved motor control circuit. Representative examples of the present teaching, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

A motor control circuit according to an example of the present invention will be described below with reference to FIG. 1 to FIG. 5.

Figure 1:
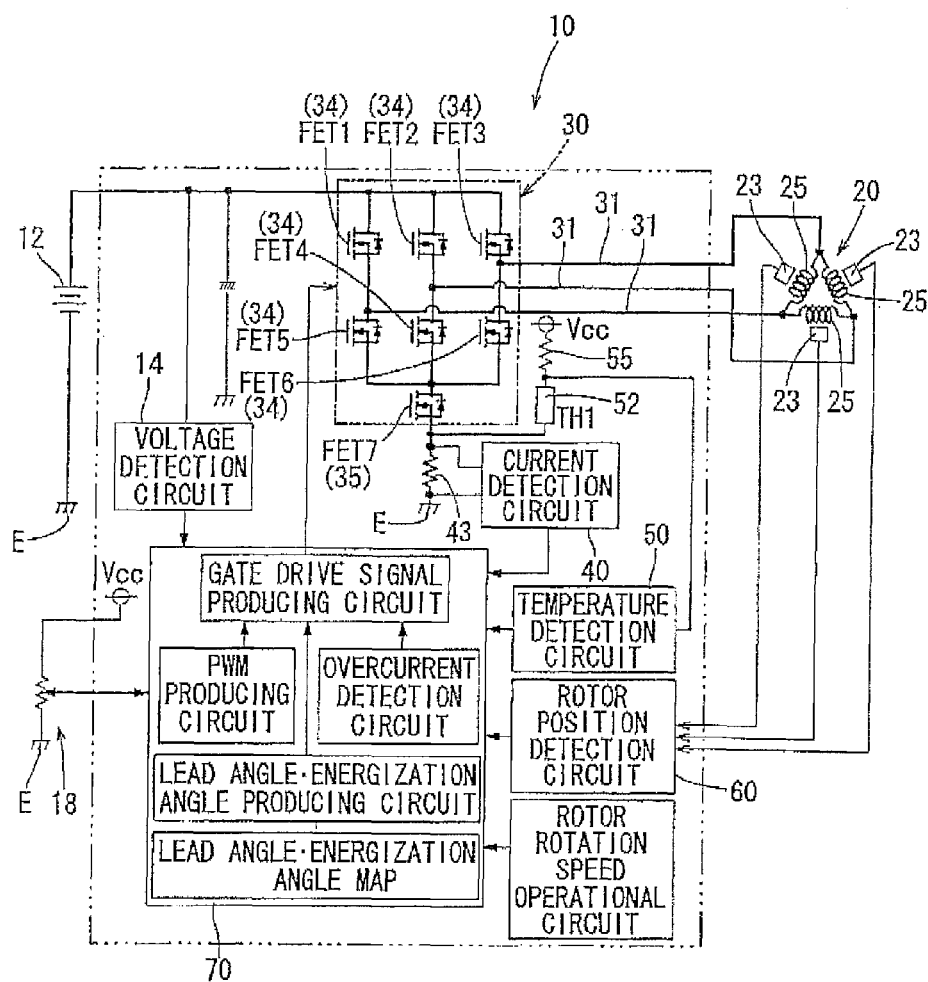
FIG. 1 is a block diagram of a motor control circuit according to an example of the present invention.

The motor control circuit 10 drives a DC brushless motor 20 (hereinafter termed motor 20) of an electric power tool. As shown in FIG. 1, the motor control circuit 10 includes a voltage detection circuit 14 that detects a voltage of a battery power supply 12, a three-phase bridge circuit 30 that controls rotation of the motor 20, a current detection circuit 40 that detects a motor current, a temperature detection circuit 50, a rotor position detection circuit 60 that detects a rotational position of a rotor (not shown) of the motor 20, and a controller 70 that operates the three-phase bridge circuit 30.

The three-phase bridge circuit 30 is configured to have six rotation-control switching elements 34 that are used to control the rotation of the motor 20, and a stop-control switching element 35 that stops the motor 20. Also, the three-phase bridge circuit 30 has three (U phase, V-phase, and W-phase) output lines 31, and these output lines 31 are connected to corresponding driving coils 25 (U-Phase, V-phase, and W-phase) which are arranged in a stator (not shown) of the motor 20.

A field effect transistor (FET) is used as an example of the rotation-control switching elements 34 and the stop-control switching element 35 of the three-phase bridge circuit 30. In the following description, the rotation-control switching elements 34 are termed FETs 1 to 6, and the stop-control switching element 35 is termed FET 7.

The current detection circuit 40 includes a shunt resistor 43 that is electrically connected between a source terminal S (refer to FIG. 2) of the FET 7 and a ground E. The current detection circuit 40 is configured to convert a motor current into a voltage signal that is transmitted to the controller 70.

The temperature detection circuit 50 detects temperature of the FET 7 or the shunt resistor 43 by use of a thermistor 52, as will be described later. The temperature detection circuit 50 is configured to transmit a temperature signal to the controller 70.

The rotor position detection circuit 60 detects a rotational position of the rotor (not shown) based on signals from three magnetic sensors 23 of the motor 20 which are arranged at an angular interval of 120° in a circumferential direction. And the rotor position detection circuit 60 is configured to transmit a rotational position signal of the rotor to the controller 70.

To control the rotation of the motor 20, the controller 70 is configured to drive the FETs 1 to 6 of the three-phase bridge circuit 30, based on a trigger-type operation switch 18 of the electric power tool and also based on a signal from the rotor position detection circuit 60. Further, the controller 70 is configured to turn off the FET 7 of the three-phase bridge circuit 30 in order to stop the motor 20 in a case where a motor current signal of the current detection circuit 40 or a temperature signal from the temperature detection circuit 50 exceeds a predetermined threshold value.

The thermistor 52 connected to the temperature detection circuit 50 detects temperature by means of a change in electrical resistance caused by a change in temperature.

Figure 2:
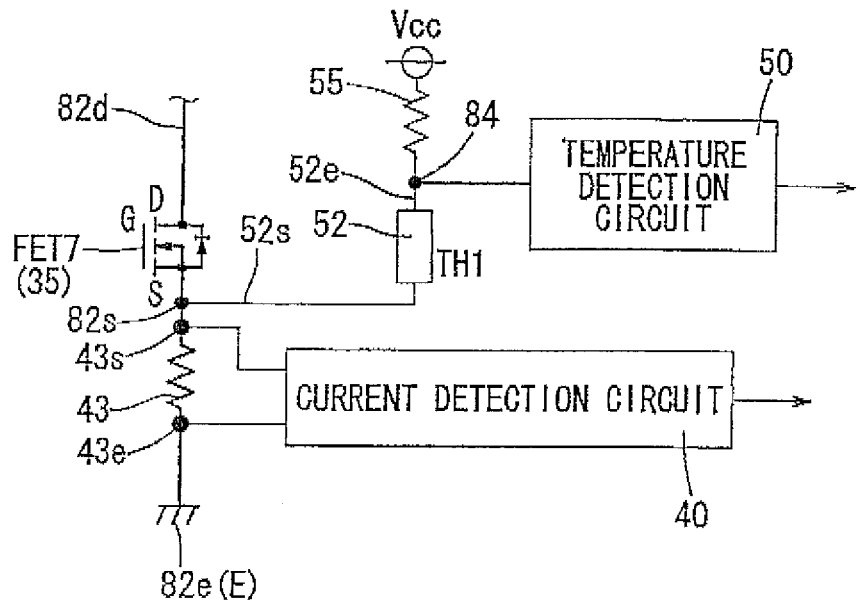
FIG. 2 is a circuit diagram showing a temperature detection element section of the motor control circuit.

As shown in FIG. 2, one terminal 52s of the thermistor 52 is connected to an electrical connecting section between the source terminal S of the FET 7 and the shunt resistor 43.

Further, the other terminal 52e of the thermistor 52 is connected to the temperature detection circuit 50 and one end of a reference resistor 55. The other end of the reference resistor 55 is connected to a constant-voltage power supply Vcc. The reference resistor 55 is set to have an appropriate resistance value, corresponding to a resistance value of the thermistor 52.

In general, an interterminal voltage of the thermistor 52 can be represented by the formula Vcc×(thermistor 52 resistance value)/(thermistor 52 resistance value reference resistor 55 resistance value). Accordingly, temperature can be detected by the interterminal voltage of the thermistor 52.

As described above, the terminal 52s of the thermistor 52 is connected to the electrical connecting section between the source terminal S of the FET 7 and the shunt resistor 43. In other words, the terminal 52s of the thermistor 52 is not directly connected to the ground E unlike in the case of a known temperature detection circuit. Accordingly, compared to a case where the terminal 52s of the thermistor 52 is directly connected to the ground E, a temperature measurement error occurs corresponding to a resistance value of the shunt resistor 43. However, the resistance value of the thermistor 52 is sufficiently larger than that of the shunt resistor 43. Thus, the temperature measurement error (approximately 1° C. in temperature) can be ignored.

Figure 3:
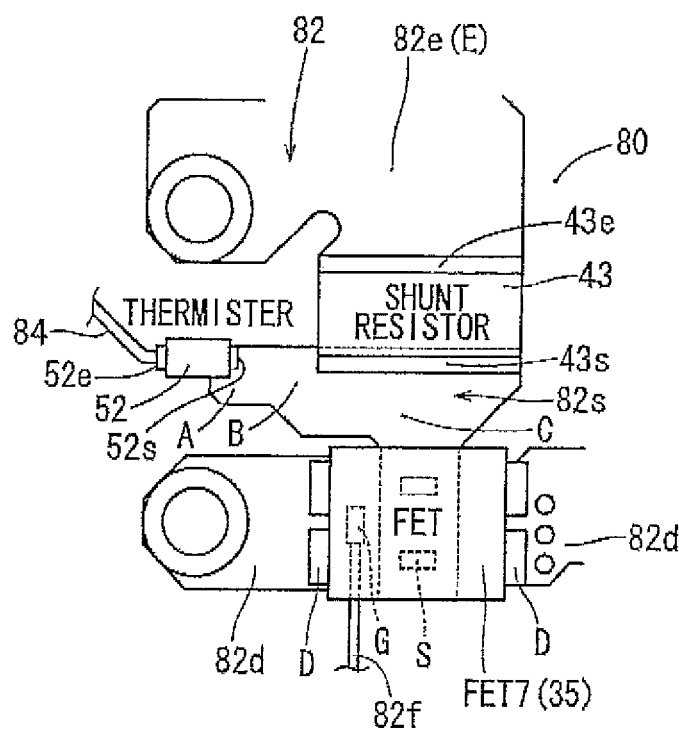
FIG. 3 is a plan view of a circuit board showing the temperature detection element section of the motor control circuit.

In the motor control circuit 10, each of the elements such as the FETs 1 to 7 and the shunt resistor 43 is electrically connected by soldering onto a conductor 82 that is formed on a surface of the electrical circuit board 80 (refer to FIG. 3). A copper foil solid pattern is suitably used as the conductor 82 of the electrical circuit board 80.

For example, regarding the shunt resistor 43 connected to the current detection circuit 40 of the motor control circuit 10, one terminal 43e is connected to a conductor 82e which is connected to the ground. E as shown in FIG. 2 and FIG. 3. Further, the other terminal 43s of the shunt resistor 43 is connected to a conductor 82s to which the source terminal S of the FET 7 is connected. Further, a drain terminal D of the FET 7 is connected to a conductor 82d to which the source terminals S of the FETs 4 to 6 are connected (refer to FIG. 1). A gate terminal G is connected to a conductor 82f (refer to FIG. 3). The one terminal 52s of the thermistor 52 is connected to the conductor 82s to which the source terminal S of the FET 7 and the terminal 43s of the shunt resistor 43 are connected. Also, the other terminal 52e of the thermistor 52 is connected to the temperature detection circuit 50 via a lead wire 84.

As shown in FIG. 3, the conductor 82s (copper foil solid pattern) to which the one terminal 52s of the thermistor 52 is connected is formed into a substantially T shape including a crossbar section and a vertical bar section (refer to the dotted lines of FIG. 3).

In the crossbar section of the conductor 82s, a distal end section A, an intermediate section B, and a base end section C are disposed in order from the left, and the distal end section A is formed to be the narrowest. A width of the intermediate section B gradually increases toward the base end section C, and the base end section C is set to be the largest, as shown in FIG. 3.

Further, a width of the distal end section A of the conductor 82s is set to be more than twice a width of the one terminal 52s of the thermistor 52, and the one terminal 52s of the thermistor 52 is connected to the distal end section A. Also, the other terminal 43s of the shunt resistor 43 is connected along an end edge of the base end section C of the conductor 82s (crossbar section). The source terminal S of the FET 7 is disposed at a position of the vertical bar section of the conductor 82s such that the FET 7 faces the shunt resistor 43.

Because of this configuration, heat of the FET 7 and heat of the shunt resistor 43 are transferred from the wide base end section C of the conductor 82s (crossbar section) through the intermediate section B to the distal end section A, and are transferred from the distal end section A to the one terminal 52s of the thermistor 52. Accordingly, the higher one of the temperature of the FET 7 and the temperature of the shunt resistor 43 that are transmitted to the thermistor 52 through the terminal 52s can be accurately measured.

The thermistor 52, the shunt resistor 43, and the conductor 82s correspond to the temperature detection element, the current detection element, and the copper foil solid pattern of the present invention, respectively.

Figure 4:
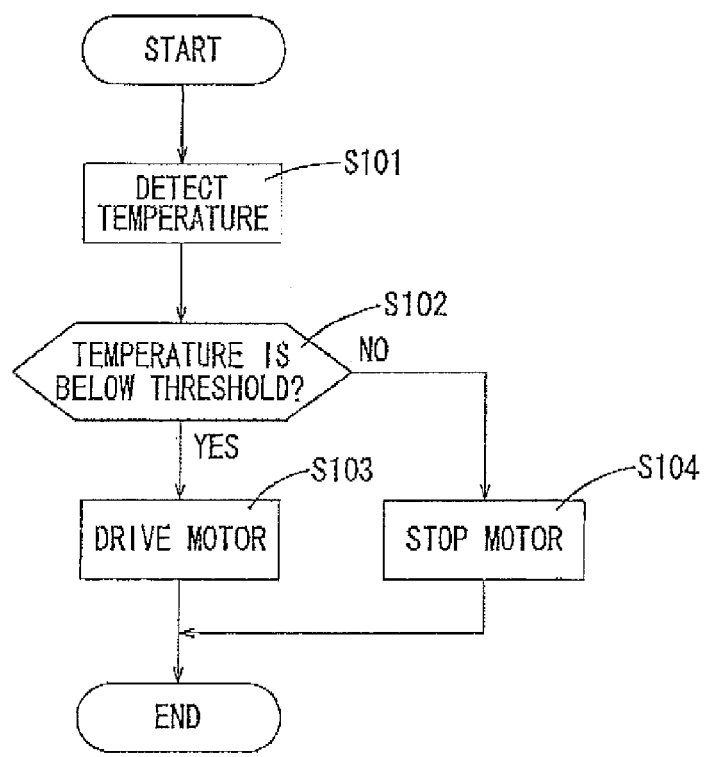
FIG. 4 is a flowchart showing an operation of the motor control circuit.

Next, an operation to control the motor 20 based on the temperature detection circuit 50 will be described. The control of the motor 20 based on the temperature detection circuit 50 is performed based on the flowchart shown in FIG. 4. Processing shown in the flowchart of FIG. 4 is repeated at predetermined time intervals based on a program stored in a memory of a microcomputer of the controller 70 of the motor control circuit 10.

First, when the operation switch 18 of the electric power tool is operated and the motor 20 is driven, the temperature of the FET 7 or the shunt resistor 43 is detected by the thermistor 52 (step S101). Then, whether the temperature detected by the thermistor 52 exceeds a predetermined threshold value or not is judged (step S102). In a case where the temperature is equal to or less than the threshold value (YES in step S102), the FET 7 remains in an ON state and the driving of the motor 20 continues (step S103). In a case where the temperature exceeds the threshold value (NO in step S102), the FET 7 is turned off and the motor 20 stops (step S104) such that damage to the FET 7 or the shunt resistor 43 can be prevented.

It the motor control circuit 10 according to the example, the one terminal 52s of the thermistor 52 is electrically connected to the electrical connecting section between the FET 7 and the shunt resistor 43, and the other terminal 52e of the thermistor 52 is electrically connected to the temperature detection circuit 50. As such, the higher one of the temperature of the FET 7 and the temperature of the shunt resistor 43 that are transmitted to the thermistor 52 through the terminal 52s can be accurately measured. Accordingly, efficient temperature monitoring can be performed in the motor control circuit 10 by use of a single thermistor 52.

The terminal 52s of the thermistor 52 is connected to the ground E via the shunt resistor 43. The temperature measurement error of the thermistor 52 caused by the electrical resistance of the shunt resistor 43 is negligibly small, because the electrical resistance of the shunt resistor 43 is extremely small compared to the electrical resistance of the thermistor 52.

Further, the heat of the FET 7 and the heat of the shunt resistor 43 are transferred from the wide base end section C of the conductor 82s (copper foil solid pattern) via the intermediate section B to the narrow distal end section A, and transferred from the distal end section A to the thermistor 52. Accordingly, the heat of the FET 7 and the shunt resistor 43 can be effectively collected in the distal end section A of the conductor 82s and the terminal 52s of the thermistor 52, and thus temperature measurement efficiency can be improved.

The present invention is not limited to the above-described example, and can be modified without departing from the scope of the present invention. For example, the thermistor 52 is used as the temperature detection element in the above-described example, but a diode whose forward-direction voltage depends on temperature can be used as the temperature detection element.

Also, in the above-described example, the FET is used as an example of the switching element, but a power transistor or the like can be used instead of the FBI.

Figure 5:
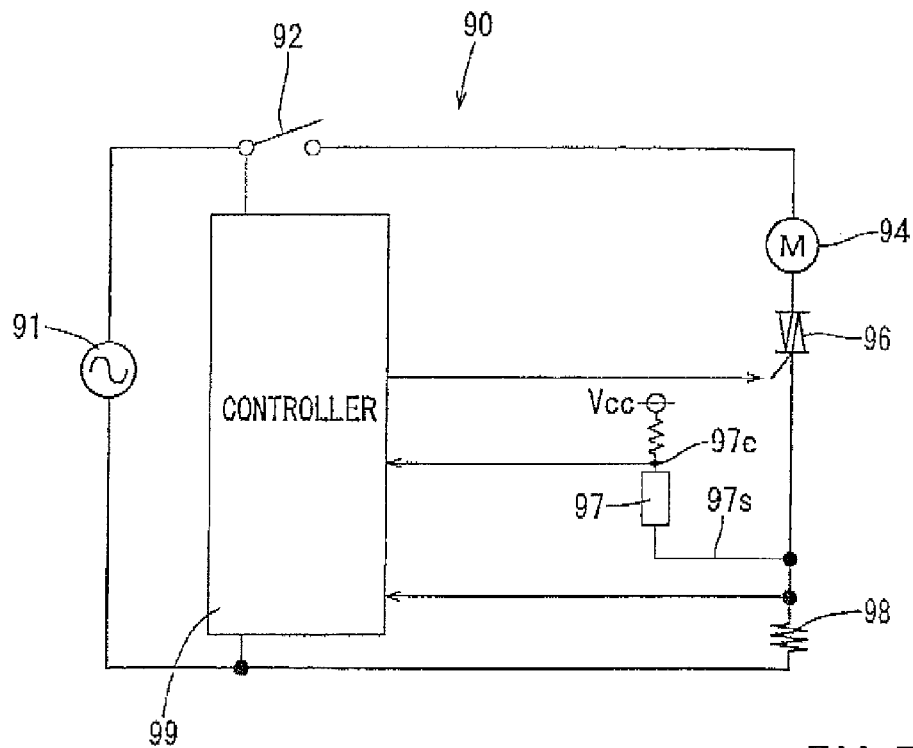
FIG. 5 is a block diagram of a motor control circuit according to another example of the present invention.
Figure 6A:
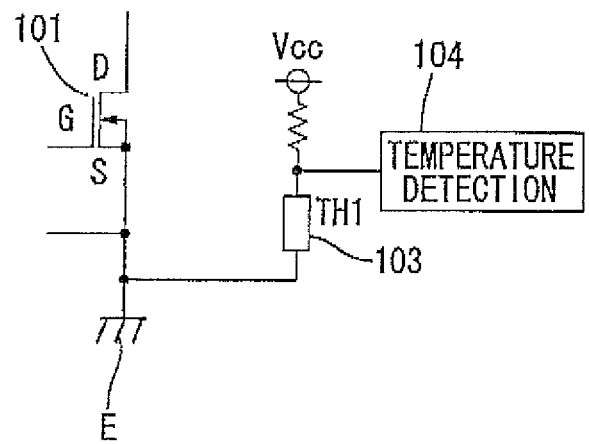
FIG. 6(A) and FIG. 6(B) are circuit diagrams showing a temperature detection element section of a known motor control circuit.
Figure 6B:
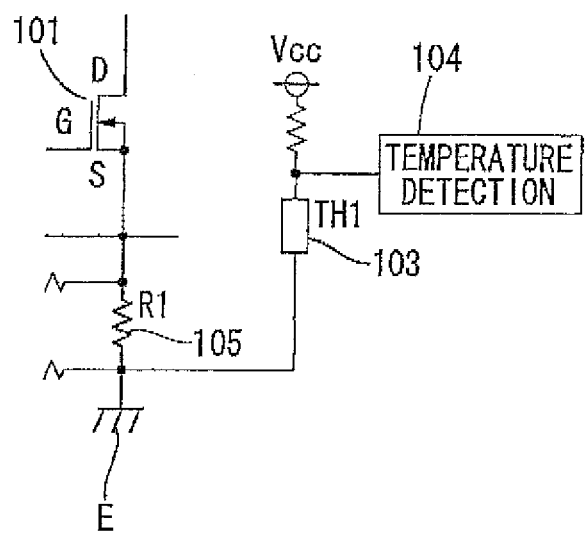
Figure 7:
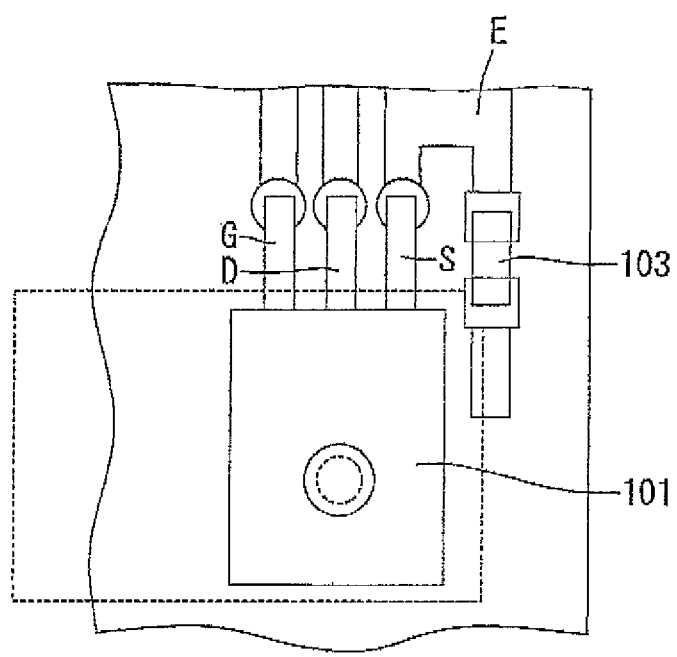
FIG. 7 is a plan view of a circuit board of the known motor control circuit.

Also, in the above-described example, the DC brushless motor 20 is used for the motor control circuit 10, but the invention can be applied to a motor control circuit 90 which is driven by an alternating current power supply 91 as shown in FIG. 5.

In the motor control circuit 90, a power switch 92, a motor 94, a bidirectional thyristor 96, and a shunt resistor 98 are connected in series. One terminal 97s of the thermistor 97 is electrically connected to an electrical connecting section between the bidirectional thyristor 96 and the shunt resistor 98. Also, the other terminal 97e of the thermistor 97 is connected to a temperature detection circuit (not shown) that is built into a controller 99. Because of this configuration, the higher one of temperature of the bidirectional thyristor 96 and the temperature of the shunt resistor 98 that are transmitted through the terminal 97s of the thermistor 97 can be accurately measured. Accordingly, efficient temperature monitoring can be performed in the motor control circuit 90 by use of a single thermistor 97.

In this example, the bidirectional thyristor 96 is used in the motor control circuit 90. However, a thyristor, an IGBT, a MOS-FET or the like can be used instead of the bidirectional thyristor 96.

In, the above-described explanation, the FET 7 is turned off and the motor 20 stops in a case where the temperature detected by the thermistor 52 exceeds the predetermined threshold value. However, the FETs can be controlled such that the motor current decreases without stopping the motor 20.

Further, the bidirectional thyristor, the IGBT, or the power transistor can also be used instead of the FET 7.

What is claimed is:

1. A motor control circuit, comprising:
   a switching element that controls a motor current;
   a current detection element that detects the motor current, the current detection element connected to the switching element in series;
   a temperature detection element configured to detect a temperature of the switching element and a temperature of the current detection element; and
   a temperature detection circuit, wherein:
   a first terminal of the temperature detection element is electrically connected to an electrical connecting section between the switching element and the current detection element; and
   a second terminal of the temperature detection element is electrically connected to the temperature detection circuit.

2. The motor control circuit according to claim 1, wherein:
   the first terminal of the temperature detection element is soldered to a copper foil solid pattern that is formed on a circuit board; and a width of a narrowest section of the copper foil solid pattern is configured to be larger than widths of the first terminal and the second terminal of the temperature detection element.

3. The motor control circuit according to claim 1, wherein the switching element and the current detection element are connected to a direct current power supply.

4. The motor control circuit according to claim 1, wherein the switching element and the current detection element are connected to an alternating current power supply.

5. The motor control circuit according to claim 1, wherein the switching element is controlled such that the motor current becomes zero or decreases when a temperature signal output from the temperature detection circuit exceeds a predetermined value.

6. The motor control circuit according to claim 2, wherein the width of the narrowest section is configured to be at least twice the widths of the first terminal and the second terminal of the temperature detection element.

7. The motor control circuit according to claim 2, wherein:
the copper foil solid pattern includes the narrowest section and a wider section; and
the current detection element and the switching element are soldered to the wider section of the copper foil solid pattern.

8. The motor control circuit according to claim 3, wherein a FET or a power transistor is used as the switching element.

9. The motor control circuit according to claim 4, wherein a bidirectional thyristor, a thyristor, or an IGBT is used as the switching element.

10. The motor control circuit according claim 1, wherein a thermistor or a diode whose forward-direction voltage depends on temperature is used as the temperature detection element.

11. An electric power tool comprising the motor control circuit according to claim 1.

* * * * *